United States Patent Office 3,113,695
Patented Dec. 10, 1963

3,113,695
LIQUID OR SOLID TERPOLYMERS OF BUTADIENE, VINYLTOLUENE, AND ISOBUTYLENE, PREPARATION THEREOF, AND METALS COATED THEREWITH
George Bosmajian, Severna Park, Md., assignor to Cities Service Research & Development Company, New York, N.Y., a corporation of New Jersey
No Drawing. Filed Nov. 28, 1960, Ser. No. 71,890
17 Claims. (Cl. 220—64)

This invention involves the preparation of a novel copolymer of butadiene, vinyltoluene, and isobutylene, and to the coating of metals therewith.

One of the problems with which the invention is concerned is the protection of metal surfaces against deterioration nad particularly against corrosion. Specifically, the invention is utilized in the coating of sheet metals utilized in containers, cans, bottle crowns, screw-top caps, and similar articles. The protective coatings also are useful for metal articles in general.

Numerous prior attempts have been made to prepare and use butadiene polymers and copolymers in forming coatings such as the preparation of can linings, but very few have been found to be acceptable. Thus, in the use of polymers prepared with Friedel-Crafts catalysts such as aluminum chloride, a common deficiency appears in subjecting the product to "boiling water" tests in that apparently residual aluminum chloride is hydrolyzed to aluminum hydroxide, producing a result called blushing in which the coating has a milky or hazy appearance and in some cases a streaked appearance. Other coatings have been prepared from polymers obtained using various catalysts including sodium, peroxides and other catalysts, and such polymers often are not fully satisfactory in that they are either too brittle and fracture in operations such as the can forming operation, or are excessively soft and rubbery, and undergo deformation to such an extent that they are unusable.

An object of the present invention is to provide a novel terpolymer of butadiene, vinyltoluene, and isobutylene, said terpolymer having desirable characteristics, and a process of preparing the same.

Another object of this invention is to provide a novel metal article having a resinous coating thereupon utilizing the terpolymer of the preceding object of invention, and a process of preparing such article.

Yet another object is to obtain and utilize a liquid terpolymer in accordance with the preceding objects of invention.

The polymer is prepared by reacting the comonomers, including a predominant proportion of butadiene and lesser proportions of vinyltoluene and isobutylene, utilizing an inert organic solvent, sodium catalyst, and moderately elevated temperatures. An unsaturated polymer having desirable characteristics, including definite unsaturation types, and proportions thereof, is obtained.

The polymer is applied to metallic substrates such as sheets or preformed articles and cured preferably in the presence of oxygen, with heat if desired, forming an exceptional resinous coating which is hard, flexible, stretchable, and chemically resistant. The coated articles may be used as such or subsequently mechanically formed into other articles.

This invention resides partially in the discovery that a copolymer of butadiene, vinyltoluene, and isobutylene, prepared under the conditions of this invention, is markedly superior to somewhat similar polymers prepared by other methods. The polymers of this invention are believed to have distinctive macromolecular structures, both in the uncured and cured, solid forms of polymer. This distinctive structure is one reason for the superiority of the final coatings obtained. Relevant details of the molecular structure are indicated by the types and the ratios of unsaturation types in the uncured polymer, which are determined by the monomers utilized, polymerization conditions, selection of suitable catalysts, and similar features.

The comonomers consist of butadiene, vinyltoluene and isobutylene. "Butadiene" refers to 1,3-butadiene as is conventional. "Vinyltoluene" includes the isomers as well as mixtures thereof; thus para- and meta-vinyltoluene mixtures are useful. Substantially pure meta- or para-vinyltoluene is fully operable, although not as conveniently obtained as are mixtures. None of the monomers need be absolutely pure, with the obvious proviso that water or other materials that react with or inhibit the sodium metal catalyst should be absent, but if present, should be present in minimum amounts. The approximate proportions of monomers useful in this invention are as follows:

|  | Percent |
|---|---|
| Butadiene | 60 to 90 |
| Vinyltoluene | 5 to 20 |
| Isobutylene | 5 to 20 |

Throughout the specification, all parts are by weight unless otherwise noted.

Reaction conditions are variable but generally are within limits which are critical. The quantity of sodium is between 0.1 and 10.0%, preferably between 0.5 and 2.0%, based on the weight of the monomers. The time is related to temperature. Thus at 50° C.–55° C. conversions ranged from 30 to 95% as the time ranged from about 2 to 8 hours, although up to about 20 hours is useful at this temperature. In general, the time may be between about 0.5 and 40 hours, and is varied inversely with temperature. Elevated temperatures of from 25° to 125° C. are useful, although about 50° C. is preferred. Solvents are desirably utilized, and inert, non-polar solvents are preferred. Useful solvents are those which do not react with the monomers, are inert to sodium, and do not polymerize in this reaction. Included are ligroin, benzene, xylene, cyclohexane, toluene, pentane, hexane, heptane, 1,4-dioxane, petroleum ether, and similar compounds or mixtures thereof. The preferred ratio of solvent or diluent to monomers, by weight, is between 2 to 1 and 0.5 to 1, although higher ratios such as 6 to 1, and lower ratios such as 0.1 to 1, may be used. Pressure is the autogenous pressure developed by the system. At 50° C. this pressure is approximately 50 p.s.i. Much higher and lower pressures are useful, for example from about 20 to about 1000 p.s.i.a.

Post-polymerization treatment of the polymer solution includes "killing" excess sodium. One procedure involves adding to the polymer solution a small amount of methanol, at least in a molar equivalent to sodium and preferably with a slight excess, say 10–100%, to inactivate the catalyst, then precipitating the polymer in a large excess of methanol, such as three volumes of methanol per volume of reaction mixture, centrifuging, and recovering the polymer. The step of using a large excess of methanol may be omitted, and the slight excess may be separated by decantation suitably including centrifugal decantation. Known recovery methods other than methanol precipitation may be used, in order to retain methanol-soluble polymer fractions.

The polymer is preferably an oily liquid having curing properties of drying oils; it may be in the form of a solid or semi-solid, however. In any event, the polymer must be curable to a resinous state as described herein. The intrinsic viscosity of the polymer is preferably between 0.05 and 0.3 deciliter per gram at 100° F., higher and lower values being useful, however. In utilizing the polymer, the viscosity of the liquid polymer or of a polymer solution of the liquid, semi-solid, or solid polymer, is preferably between 1000 and 5000 centistokes at 25° C. Higher and lower values are useful for some applications, since it is known that polymers having viscosities ranging from 3 to 100,000 centistokes at 25° C. may be applied as coatings. Polymer solvents, if used, may be the same as the reaction diluents listed above, although higher boiling materials such as xylene are preferred.

The resulting sodium-catalyzed viscous liquid terpolymer contains the monomers in approximately the following proportions by weight:

| | Percent |
|---|---|
| Butadiene | 70–95 |
| Vinyltoluene | 4.5–25 |
| Isobutylene | 0.5–5 |

Preferably between about 1% and 3% of isobutylene is incorporated into the polymer. Where substantially complete conversion of butadiene to polymer is achieved, the vinyltoluene is incorporated into the polymer in nearly the same proportions in which it exists in the monomer mixture. At 50° C. and 2–8 hours, 90% or more of the vinyltoluene is incorporated into the polymer. By "incorporated" it is meant that the specified monomer is an integral part of an actual terpolymer, and not in the form of a homopolymer or an unreacted monomer.

The polymerization process may be conducted in batches or continuously.

The macromolecular structure of the polymers according to this invention is relatively constant or reproducible as defined by the amounts and quantitative ratios of unsaturation types, total determinable unsaturation, and the ratios of monomers in the reaction mixture. "Unsaturation types" as the term is understood in the field of stereochemistry and as used herein refers to the mode of substitution of hydrogen and carbon atoms about a carbon to carbon double bond, i.e.

Cis

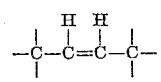

Trans

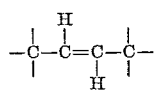

Monosubstituted vinyl (monosubstituted ethylene)

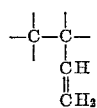

Tetrasubstituted vinyl (tetrasubstituted ethylene)

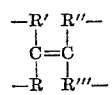

This terminology is also described in part in Chemical and Engineering News, vol. 37, No. 12, page 59, March 23, 1959. Absorptivity data for the determination of the several olefin types were from the spectra obtained prior to the determinations described herein from known olefins. These absorptivities are similar to those reported in the literature, e.g., McMurry, H. L., and Thornton, Vernon, "Correlation of Infrared Spectra of Paraffins, Olefins, and Aromatics with Structure"; Analytical Chemistry, vol. 24, pages 318–34 (1952). The quantities of the several types of unsaturation were determined from infrared spectra at wave lengths of 10.98±0.2 microns for monosubstituted vinyl unsaturation, 10.34±0.2 microns for trans unsaturation, and about 14 microns for cis unsaturation. The absorptivity for monosubstituted vinyl was taken as the average of the molar absorptivities of (1) vinyltoluene (predominantly the meta and para isomers) and of (2) 4-vinylcyclohexene-1. For cis unsaturation, the absorptivity was that of the cis-isomer of 4-methylpentene-2, and the absorptivity for trans unsaturation was based on the trans-isomer of 4-methylpentene-2. Absorptivities for these determinations were:

| | Liters/mole-cm. |
|---|---|
| Cis | 92 |
| Trans | 118 |
| Monosubstituted vinyl | 149 |

The infrared spectrometer used was a Baird-Atomic Model 455.

Amounts of such unsaturation types as determined by infrared spectroscopy in the polymer according to this invention are in the following approximate ranges:

| | Moles/100 g. |
|---|---|
| Cis | 0.10–0.35 |
| Trans | 0.30–0.55 |
| Monosubstituted vinyl | 0.80–1.15 |

The cis and trans unsaturation types are considered to be the result of 1,4 addition. The total unsaturation as determined by infrared data is not of great value in itself for defining polymer structure. The principal value of the infrared data is to delineate the structure of the polymer by the relative amounts of cis, trans, and vinyl unsaturation.

Although infrared data shows incorporation of isobutylene into the polymer is not extensive, the presence of this monomer affects the reaction and polymer structure in a favorable manner. Tetrasubstituted vinyl unsaturation may not be ascertained with infrared data. The total unsaturation is not known precisely, for the reason that chemical determination, by iodine, iodine monochloride, iodine monobromide, or similar means, is lower than that determined by infrared. On a solvent free basis, total chemically determined (e.g. iodine monochloride in CCl₄) unsaturation suitably ranges from about 1.2 to about 1.66 moles/100 g., and may extend up to about 1.8 moles/100 g. Low values may be caused by the presence of inert solvent or diluent. "About" denotes approximate values as is usual and immaterial deviations from the precise figures stated are intended to be included. The qualities of the adherent, hard, flexible, stretchable, cured coating are believed due in large part to the structure of the curable polymer as defined above.

The following are representative of the methods for preparing the novel polymers of this invention, useful to form cured resinous coatings upon metal:

EXAMPLE 1

The reactants including 80 parts butadiene, 10 parts vinyltoluene, and 10 parts isobutylene were placed in a glass reaction vessel with 200 parts Skellysolve B (a mixture of hydrocarbons including hexanes, heptanes, octanes, and solvent naphtha, and having a boiling range of 63° to 75° C.). Finely divided sodium metal was added in the amount of 1% by weight, based on the total monomers, and dispersed in the mixture.

The vessel was sealed, and the temperature raised to 50° C. and held at that point for 6 hours. A very viscous polymer was recovered by steps including precipitation in a large excess of methanol, decanting, and drying on a steam bath under vacuum, in a yield of 88% based on the total monomers charged. The iodine number was 358 (1.42 moles of unsaturation/100 g.) and infrared analysis of the viscous polymer in solution indicated the ratio of monosubstituted vinyl unsaturation to trans unsaturation to be 1.86 to 1.

EXAMPLE 2

Copolymers using butadiene, isobutylene, and vinyltoluene as comonomers, sodium dispersion as initiator, and naphtha (B.P.: 83° C. to 98° C.) as solvent were prepared by the following procedure which was used in a plurality of runs.

The reactants, butadiene, isobutylene, and vinyltoluene, were employed approximately in the ratio 8:1:1, respectively. The sodium dispersion or suspension was 50 weight percent sodium, the remainder being toluene. Approximately 4 weight percent sodium, based on the total weight of monomers was utilized. The total weight of reactants and initiator was then equal to about ⅓ by weight of the total charge, the remaining approximately ⅔ being the solvent, dry naphtha.

Vinyltoluene was dissolved in the solvent. This solution and the sodium dispersion were charged to a stainless steel autoclave in the following manner. About half of the solution was sucked into the autoclave through the blow-out tube, followed by the sodium dispersion, which was followed in turn by the rest of the solution. This tube was closed off and the isobutylene and butadiene were charged from pressure cylinders into the autoclave by heating the pressure cylinders. The autoclave was sealed, and the temperature rose spontaneously to 50° C., where it was controlled for either five or six hours, and the autoclave was then vented until most of the butadiene was removed. The remaining catalyst was deactivated with methanol, and the polymer recovered by precipitation with a large excess of methanol.

The conditions and results were as follows:

*Weights of Materials Charged in Grams*

| Experiment No. 2 | Butadiene | Isobutylene | Vinyltoluene | Naphtha | Na Suspension, ml. |
|---|---|---|---|---|---|
| A | 395 | 51 | 51 | 1,000 | 20 |
| B | 350 | 45 | 45 | 890 | 18 |
| C | 395 | 51 | 51 | 1,000 | 20 |
| D | 400 | 56 | 51 | 1,000 | 20 |

Runs A, B and D were for 6 hours, and run C for 5 hours; all at about 50° C.

*Analyses of Purified Polymers*

| Experiment No. 2 | Weight Pure Polymer, grams | C and H, Percent Avg. 2 detn. | | Unsatn., I.R. moles/100 g. | | | Percent Butadiene in Polymer from Unsatn. |
|---|---|---|---|---|---|---|---|
| | | C | H | Trans C=C | cis C=C | Mono subs. vinyl | |
| A | 272 | 88.91 | 10.72 | 0.39 | 0.24 | 0.91 | 83 |
| B | 212 | 89.09 | 11.02 | 0.41 | 0.24 | 0.86 | 81.5 |
| C | 222 | 86.68 | 10.69 | 0.39 | 0.25 | 0.93 | 85 |
| D | 350 | | | 0.39 | 0.24 | 0.88 | 81.5 |

The viscous polymer from run 2–A was dissolved in solvent and Brookfield viscosity evaluations were made. The polymer showed an increasing viscosity with an increasing rate of shear. The kinematic viscosities of the polymer solution 2–B (76% naphtha) was 3.06 centistokes at 100° F., and for polymer solution 2–C was 5.0 centistokes at 100° F. The intrinsic viscosity of "spin-dry" purified polymer (subjected to gentle heat under vacuum to remove even small amounts of solvent) from run 2–C was 0.14 dl./g. (100° F.).

Chemically determined unsaturation for the polymer is lower than that indicated by infrared data. For example, polymer 2–A in solution had an unsaturation of 1.24 moles/100 g., and after spin dry purification, of 1.25 moles/100 g. as determined chemically such as by titration with iodine monobromide. The same polymer had a total unsaturation of 1.54 moles/100 g. as evaluated by infrared data. Since the latter data does not show, with precision, all types of unsaturation, the still lower value for chemically ascertained unsaturation is surprising. The other polymers were similar; thus polymer 2–C, with solvent removed, had unsaturation corresponding to 1.30 moles/100 g. as determined by iodine monobromide.

EXAMPLE 3

Following the procedure of Example 2, the following polymerizations were conducted at 50° C.:

| Experiment No. 3 | Butadiene, g. | Vinyltoluene, g. | Isobutylene, g. | Na dispersion, g.[a] | Ligroin, g. | Time, hr. |
|---|---|---|---|---|---|---|
| A | 380 | 47.5 | 47.5 | 19.5 | 950 | 6 |
| B | 470 | 59 | 59 | 23.5 | 1,180 | 5 |
| C | 470 | 59 | 88 | 23.0 | 1,180 | 5 |
| D | 470 | 59 | 59 | 23.0 | 1,180 | 4.5 |
| E | 370 | 46 | 46 | 18.5 | 925 | 5.5 |
| F | 450 | 56.5 | 56.5 | 22.5 | 1,130 | 5.5 |
| G | 440 | 55 | 55 | 22 | 1,105 | 5.5 |
| H | 370 | 46 | 46 | 18.5 | 925 | [b] 5.5 |

[a] 50% toluene, 50% sodium, by weight.
[b] Remained in the autoclave overnight at room temperature.

These polymer solutions were allowed to stand undisturbed, and solid matter separated. The remaining sodium was inactivated as described above. The supernatant solutions were combined and mixed intimately with three times their own volumes (in several batches) of methanol by use of a one-gallon capacity Waring Blendor. The methanol-ligroin-polymer suspension was allowed to settle over a weekend to give optimum separation of polymer (wet) from methanol wash. The polymer, in about one pint batches, was spun dry under vacuum. A total weight of 2730 g. of polymer was obtained. This represents (1) a 62.5% yield of desired polymer based on total reactants; (2) a 64% selectivity of desired polymer based on total reactants; and (3) a conversion of 99.4% of the reactants.

The essentially solvent-free polymers from runs 3–A through 3–H were combined, and the following gives unsaturation data of the composite sample:

Unsaturation _____ 1.29 mol/100 g. sample
(chemically determined).

Infrared analysis:
  Trans C=C _____ 0.36 mol/100 g.
  Mono-substituted
    vinyl C=C _____ 1.05 mol/100 g.
  Estimated cis C=C _____ 0.19 mol/100 g.

A number of terpolymer samples according to the invention were evaluated as to relative proportions of the unsaturation types appearing in the polymer samples. It was found the ratio trans/cis is not over about 4, generally the lowest value being about 1.3, the highest value about 3.6, and the mean about 2.0. Monosubstituted vinyl unsaturation predominates; that is, the ratio monosubstituted vinyl/cis+trans is greater than about 1. Generally the low values for the latter ratio were about 1.2 and the high values about 2.2, with the mean being about 1.6. To reiterate, it is significant that the ratio trans/cis is not over about 4, and that the quantity of monosubstituted vinyl unsaturation predominates over the total of the other types of measurable unsaturation. It is to be understood that the particular monomers and their proportions, and the polymerization conditions including catalyst identity, are controlling process factors as regards the structure of the polymer and its properties as a coating.

As used above, the extent of the reaction is calculated as follows:

$$\text{Conversion} = \frac{\text{wt. monomers consumed} \times 100}{\text{wt. total monomers fed}}$$

$$\text{Selectivity} = \frac{\text{wt. of a single product} \times 100}{\text{wt. monomers consumed}}$$

The yield based on the amount of monomers fed or introduced into the reaction zone may be calculated by multiplying selectivity by the conversion of butadiene to products and dividing by 100.

This invention also comprises coating a metal surface with the polymer as defined above and curing the coating preferably in the presence of air or oxygen, and preferably by baking. In the case of a flat metal article such as tin plate, the polymer, for example as a 50% solution of non-volatile (NV) solids in xylene, may be roller coated by conventional procedures. Other coating methods may be used, including brushing, spraying and immersing or dipping an article in the polymer composition, the viscosity of the compounded polymer being related to the coating method used. Preferably the polymer coating is cured in the presence of air at temperatures between about 150° C. and about 500° C. for a period of between about 0.1 second and about 15 minutes. In addition to conventional baking ovens, using radiated heat for example, induction heating may be used, on the coated metal sheet or on a formed can, coated after forming with the polymer utilized. Hot natural gas combustion products, comprising air, may come into direct contact with the coating being cured. The mechanism of curing is analogous to that of natural drying oils, and involves oxidation, further polymerization, and cross-linking of the synthetic drying oil or polymer.

By way of illustration, the description as to a metal substrate is directed primarily to electrolytic tin coatings upon ferrous metal, to black iron, and to aluminum, although other metals are useful as hereinafter set forth. A particularly important area of application of this invention is in the can lining art. Of the billions of metallic cans used in the United States annually, approximately 60 percent are food cans, 15 percent are beer cans, and 2 percent are pet food cans. Various organic or resinous linings for such cans have been used in the past for the purpose of supplementing the corrosion resistance of tin plate or as a substitute therefor. Can linings must be resistant to can contents, alkalies, acids, moisture, and solvents. They must be non-toxic, odor-free, and contribute no flavors to the contents of the can on standing. Processing of the can after applying the coating, involving fabrication, cutting or stamping and the formation of seams, including steps such as soldering, causes many linings to fail. The can may be processed along with its contents for periods of an hour or more at temperatures of 200° to 400° F. (93°–204° C., approximately). Occasionally the canned products stand for one to two years before being used, and any deterioration of the container usually contaminates the contents.

In addition to can linings the process and product of the present invention include applications such as protective and decorative coatings on articles of hardware such as door knobs, electrical insulation, varnishes, and protective coatings for metals in general.

The particular metal articles useful in this invention are prepared by known methods. Thus conventional tinplate is prepared by electroplating using an aqueous electrolyte to obtain a layer of tin of about 0.03 mil thickness or ¼ pound tin per base box. A base box is the area of 112 sheet metal plates 14 inches by 20 inches equal to 217.78 sq. ft., 20.232 sq. meters, or 31,360 sq. inches. The tinplate may also be ½ pound electro tinplate, and may vary from about ⅛ pound to 10 pounds or more per base box. The surface may be so-called bright tin and/or contain an oxide coating anodically or otherwise produced. Tinplate coated by hot-dip methods is useful. For the production of black steel or iron conventional treatments include using hot aqueous solutions of alkaline compounds such as sodium hydroxide and alkali metal nitrates and nitrites, in which case a black oxide coating is obtained. Other metal surfaces may also be treated according to this invention. For example, aluminum, rolled, "spun," or otherwise formed may be coated without further treatment or may have an anodically produced aluminum oxide coating thereupon, which in turn may be a porous oxide or may be sealed with hot water, steam, or various nickel and cobalt salts. In addition, steel, zinc, galvanized ferrous metal, copper, brass, and other metal surfaces may be treated using the process of this invention and to obtain the product of this invention.

A typical procedure to test a polymer is to dilute the polymer to 50% non-volatiles (NV) in xylene if necessary, and to utilize a drawbar to manually apply a liquid film of polymer or polymer in solution 1 mil or 1½ mils thick, the metal substrate being ¼ pound electrolytic tinplate. In curing the polymer identical test blanks were subjected to different temperatures, the representative commercially useful ones chosen here being approximately 350° F., 400° F., and 450° F., maximum metal temperature. The articles were subjected to these temperatures for a period of ten minutes.

Some of the objective and subjective tests of the cured test blank may be defined as follows:

I. Wedge bend: a suitably sized portion of a coated sheet of tin plate is bent to a U-shape around a ¼" diameter mandril with the coated surface to be tested on the outside. The ¼-shaped test specimen is laid on an anvil into which has been cut a wedge-shaped step, continuously variable in depth from zero at one end to a suitable depth at the other. The test specimen is struck by a five-pound weight, thereby producing a folded specimen having a continuously varied radius of fold from zero at one end to about ⅛" at the other. This measures the adhesion, flexibility, stretchability, and impact resistance of the film, and simulates the formation of a side seam in a can forming operation. Evaluation of this test is performed by immersing the article in a solution of copper sulfate treated to plate copper onto the exposed metallic surface. A score of 100 is perfect.

II. 202 can end fabrication: testing of a can end assembled from tinplate having a cured polymer coating which is placed in copper sulfate solution as above. This measures adhesion and abrasion resistance of a can end double seam, and is rated good, fair, poor or numerically.

III. Boiling water: the cured coated article is placed in boiling water to obtain an indication of the ability of the film to withstand high temperature processes involving exposure to water. Any whitening of the film is called blushing, and any peeling of the film is noted. If the film is satisfactory in this test, it is rated as "passing" the test.

Other tests, such as the conventional pencil "hardness" tests, evaluations of the appearance; dry properties such as tackiness or lack thereof, integrity of the film peeled or scraped from the substrate, adherence to the substrate, and acetone resistance, are useful.

The liquid film is between 0.005 and 75 mils in thickness, preferably between 0.1 and 2.0 mils, and has a non-volatile polymer content of from 10% to 100%, preferably 50% to 60%, as a minimum. The dry film is between about .005 and 50 mils in thickness, and preferably is present in an amount corresponding to 2 to 7 mg./sq. in., although not limited generally to this weight, the approximate operable range for most uses being 0.3 to 50 mg./sq. in.

EXAMPLE 4

The viscous liquid polymers prepared in Examples 1–3 above were diluted with solvent, applied to ¼ pound box basis electrolytic tinplate sheets as a 1 mil film, baked in the presence of air at the indicated temperatures for 10 minutes, and evaluated. The following results were obtained, the polymer number corresponding to the above example:

| Polymer of Example No.— | Wedge Bend Test | | | 202 Can End Test | | |
|---|---|---|---|---|---|---|
| | 350° | 400° | 450° | 350° | 400° | 450° |
| 1 | 74 | 71 | 42 | 85 | 80 | 70 |
| 2 (composite) | 62 | 37 | 26 | 55 | 45 | ----- |
| 3 (composite) | 70 | 65 | ----- | 60 | 50 | ----- |

All of the coatings passed the boiling water test, the tabulated tests above being representative of the general physical qualities of the coated panels. The appearances and general physical properties of the coatings were good.

An important advantage is that commercial tinplate may generally be used without preliminary removal of oily coatings commonly present. In some cases "eyeholes" appear in the coating. The eyeholes where they appear may be eliminated readily by purifying the polymer, or compounding the polymer with materials including vinyl type polymers such as polyvinyl butyral, silicone oils and resins, natural drying oil type polymers, "Cellosolve" plasticizers, ethyl cellulose, aluminum isopropylate and 2-ethylhexanol, pine oil, and various wetting agents.

EXAMPLE 5

Using black iron (CMQ Black Plate) in place of the tin-plated sheet of Example 4, similar results were obtained.

EXAMPLE 6

Usually good results were obtained using aluminum in place of the substrate of Example 4.

The polymers of the invention are amenable to improvement or adaptation for specific application by the use of compounding ingredients. Thus, driers such as manganese and cobalt phthalates and oleates are sometimes useful, as are natural drying oils, pigments, and plasticizers. Carboxylation of the polymers or other known after-treatments may be applied to modify the polymer properties.

This application is a continuation-in-part of an application filed July 15, 1959, Serial No. 827,178, now abandoned.

I claim:

1. As an article of manufacture, a metal article having a surface thereof coated with a flexible, adherent cured resinous layer of a copolymer of predominantly butadiene, with lesser proportions of vinyltoluene and isobutylene, said copolymer prior to curing having drying properties, and having about 0.10 to 0.35 mole/100 g. of cis unsaturation, about 0.30 to 0.55 mole/100 g. of trans unsaturation, and about 0.80 to 1.15 moles/100 g. of monosubstituted vinyl unsaturation.

2. As an article of manufacture, a metal article having a surface thereof coated with a flexible, adherent, cured resinous layer of a sodium-catalyzed copolymer predominantly of butadiene, with lesser proportions of vinyltoluene and isobutylene.

3. The article of claim 2 in which said copolymer contains, by weight, about 70 to 90% butadiene, 4.5 to 25% vinyltoluene, and 0.5 to 5% isobutylene.

4. As an article of manufacture, a metallic container having a surface thereof coated with a flexible, adherent, cured resinous layer of a copolymer of predominantly butadiene, with lesser proportions of vinyltoluene and isobutylene, said copolymer prior to curing having drying properties, and having about 0.10 to 0.35 mole/100 g. of cis unsaturation, about 0.30 to 0.55 mole/100 g. of trans unsaturation and about 0.80 to 1.15 moles/100 g. of mono-substituted vinyl unsaturation.

5. As an article of manufacture, a metallic container having a surface thereof coated with a thin layer of a cured resinous sodium-catalyzed copolymer predominantly of butadiene with lesser amounts of vinyltoluene and isobutylene.

6. The article of claim 5 in which said copolymer contains, by weight, about 70 to 90% butadiene, 4.5 to 25% vinyltoluene, and 0.5 to 5% isobutylene.

7. A process of preparing a metal article having a protective coating thereupon comprising the steps of coating a metal surface with a liquid composition comprising an unsaturated copolymer predominantly of butadiene, with lesser proportions of vinyltoluene and isobutylene, said copolymer having about 0.10 to 0.35 mole/100 g. of cis unsaturation, about 0.30 to 0.55 mole/100 g. of trans unsaturation, about 0.80 to 1.15 moles/100 g. of monosubstituted vinyl unsaturation, and curing the coating to a resinous state.

8. A process of preparing a metal article having a protective coating thereupon comprising the steps of coating said surface with a liquid polymer composition comprising an unsaturated sodium-catalyzed copolymer predominantly of butadiene, with lesser proportions of vinyltoluene and isobutylene, and curing the coating to a hard, adherent resinous film.

9. The process of claim 8 in which said copolymer contains, by weight, about 70 to 90% butadiene, 4.5 to 25% vinyltoluene, and 0.5 to 5% isobutylene.

10. A method of preparing a metal article having a protective coating thereupon comprising the steps of preparing an unsaturated copolymer having drying properties by subjecting a monomer mixture having a predominant proportion of butadiene with lesser amounts of vinyltoluene and isobutylene to an elevated temperature in the presence of sodium catalyst, recovering said copolymer, coating a surface of said article therewith, and curing the coating to a hard, resinous, adherent film.

11. A method of preparing an unsaturated liquid copolymer having properties of drying oils comprising the steps of subjecting a monomer mixture having a predominant proportion of butadiene with lesser amounts of vinyltoluene and isobutylene to an elevated temperature in the presence of sodium catalyst, and recovering the liquid copolymer.

12. The method of claim 11 in which said monomer mixture contains, by weight, about 60 to 90% butadiene, about 5 to 20% vinyltoluene, and about 5 to 20% isobutylene.

13. An unsaturated, sodium-catalyzed copolymer predominantly of butadiene with lesser proportions of vinyltoluene and isobutylene, said copolymer having about 0.10 to 0.35 mole/100 g. of cis unsaturation, about 0.30 to 0.55 mole/100 g. of trans unsaturation, and about 0.80 to 1.15 moles/100 g. of monosubstituted vinyl unsaturation.

14. The polymer of claim 13 which is a viscous liquid and contains, by weight, about 70 to 90% butadiene, 4.5 to 25% vinyltoluene, and 0.5 to 5% isobutylene, with the ratio trans/cis being less than about 4.

15. The article of claim 1 in which said unsaturation is such that the ratio trans/cis is less than about 4.

16. The process of claim 7 in which said unsaturation is such that the ratio trans/cis is less than about 4.

17. The method of claim 12 in which the monomer mixture is in an inert hydrocarbon solvent.

References Cited in the file of this patent

UNITED STATES PATENTS

| | | |
|---|---|---|
| 2,539,523 | Reid | Jan. 30, 1951 |
| 2,731,450 | Serniuk et al. | Jan. 17, 1956 |
| 2,873,215 | Quigley et al. | Feb. 10, 1959 |